(12) United States Patent
Segura

(10) Patent No.: US 10,029,596 B2
(45) Date of Patent: Jul. 24, 2018

(54) RETAINING DEVICE FOR VEHICLE HEADRESTS

(71) Applicant: ILLINOIS TOOL WORKS INC., Glenview, IL (US)

(72) Inventor: Ricard Fortuny Segura, Sabadell (ES)

(73) Assignee: ILLINOIS TOOL WORKS INC., Glenview, IL (US)

( * ) Notice: Subject to any disclaimer, the term of this patent is extended or adjusted under 35 U.S.C. 154(b) by 5 days.

(21) Appl. No.: 15/111,879

(22) PCT Filed: Dec. 31, 2014

(86) PCT No.: PCT/US2014/073002
§ 371 (c)(1),
(2) Date: Jul. 15, 2016

(87) PCT Pub. No.: WO2015/112316
PCT Pub. Date: Jul. 30, 2015

(65) Prior Publication Data
US 2016/0332545 A1   Nov. 17, 2016

(30) Foreign Application Priority Data

Jan. 23, 2014 (ES) .................................. 201430063

(51) Int. Cl.
*A47C 1/10* (2006.01)
*B60N 2/809* (2018.01)
(Continued)

(52) U.S. Cl.
CPC ............. *B60N 2/809* (2018.02); *B60N 2/812* (2018.02); *B60N 2/815* (2018.02); *B60N 2/818* (2018.02);
(Continued)

(58) Field of Classification Search
CPC .. B60N 2/4811; B60N 2/4808; B60N 2/4805; B60N 2/48; B60N 2/487; B60N 2/4885;
(Continued)

(56) References Cited

U.S. PATENT DOCUMENTS 4,483,565 A * 11/1984 Terui ........................ A47C 7/38
297/216.12
5,056,867 A    10/1991 Foster et al.
(Continued)

FOREIGN PATENT DOCUMENTS

CN    1761591 A    4/2006
DE    29712741 U1    9/1997
(Continued)

OTHER PUBLICATIONS

ISR and WO for PCT/US2014/073002 dated Mar. 17, 2015.

*Primary Examiner* — Chi Q Nguyen
(74) *Attorney, Agent, or Firm* — Hauptman Ham, LLP

(57) ABSTRACT

A retaining device for vehicle headrests, including a guide element inside which a fixing rod for fixing a headrest can be housed, a retaining element movable between a retaining position, in which the retaining element prevents the movement of the fixing rod with respect to the guide element, and a release position, and a push button for moving the retaining element from the retaining position to the release position, and at least one lever linked with the push button transferring the movement of the push button to the retaining element, and an elastic element pushing the lever towards the retaining position of the retaining element, wherein the retaining element and the lever are made in a single piece.

7 Claims, 5 Drawing Sheets

(51) Int. Cl.
    *H01R 13/631*     (2006.01)
    *B60N 2/815*     (2018.01)
    *B60N 2/818*     (2018.01)
    *B60N 2/812*     (2018.01)
    *H01R 24/78*     (2011.01)
    *B60N 2/897*     (2018.01)

(52) U.S. Cl.
    CPC ............ *H01R 13/631* (2013.01); *B60N 2/897* (2018.02); *H01R 24/78* (2013.01)

(58) Field of Classification Search
    CPC .. B60N 2/4814; B60N 2/4841; B60N 2/4817; B60N 2/4844; B60N 2002/4897; A61G 15/125
    USPC ................ 297/410, 399, 401, 391, 404, 400
    See application file for complete search history.

(56) References Cited

U.S. PATENT DOCUMENTS

| | | | |
|---|---|---|---|
| 5,529,379 A * | 6/1996 | Stocker | B60N 2/4814 297/410 |
| 5,860,703 A | 1/1999 | Courtois et al. | |
| 7,159,946 B2 * | 1/2007 | Gurtatowski | B60N 2/4814 297/391 |
| 7,338,130 B2 * | 3/2008 | Daume | B60N 2/4814 297/391 |
| 7,429,086 B2 * | 9/2008 | Gans | B60N 2/48 297/410 |
| 7,506,956 B2 * | 3/2009 | Usui | B41J 2/165 347/23 |
| 7,914,080 B2 * | 3/2011 | Runde | B60N 2/4814 297/410 |
| 8,075,060 B2 * | 12/2011 | Gans | B60N 2/4817 297/410 |
| 8,313,148 B2 * | 11/2012 | Lardies | B60N 2/4814 297/391 |
| 9,189,017 B2 * | 11/2015 | Meyers | G06F 1/1679 |
| 9,723,931 B2 * | 8/2017 | Lu | A47C 17/86 |
| 2003/0222492 A1 * | 12/2003 | Nemoto | B60N 2/4814 297/410 |
| 2005/0280305 A1 | 12/2005 | Gurtatowski et al. | |
| 2006/0214491 A1 | 9/2006 | Metz et al. | |
| 2010/0327645 A1 * | 12/2010 | Jeong, II | B60N 2/4808 297/408 |

FOREIGN PATENT DOCUMENTS

| | | |
|---|---|---|
| DE | 19819504 C1 | 9/1999 |
| EP | 0267503 A2 | 5/1988 |
| EP | 0822117 A1 | 2/1998 |
| EP | 0953475 A1 | 11/1999 |
| ES | 2039405 T3 | 10/1993 |
| FR | 2866288 A1 | 8/2005 |
| FR | 2877287 A1 | 5/2006 |
| JP | 2013-147101 A | 8/2013 |
| WO | 9825792 A1 | 6/1998 |

* cited by examiner

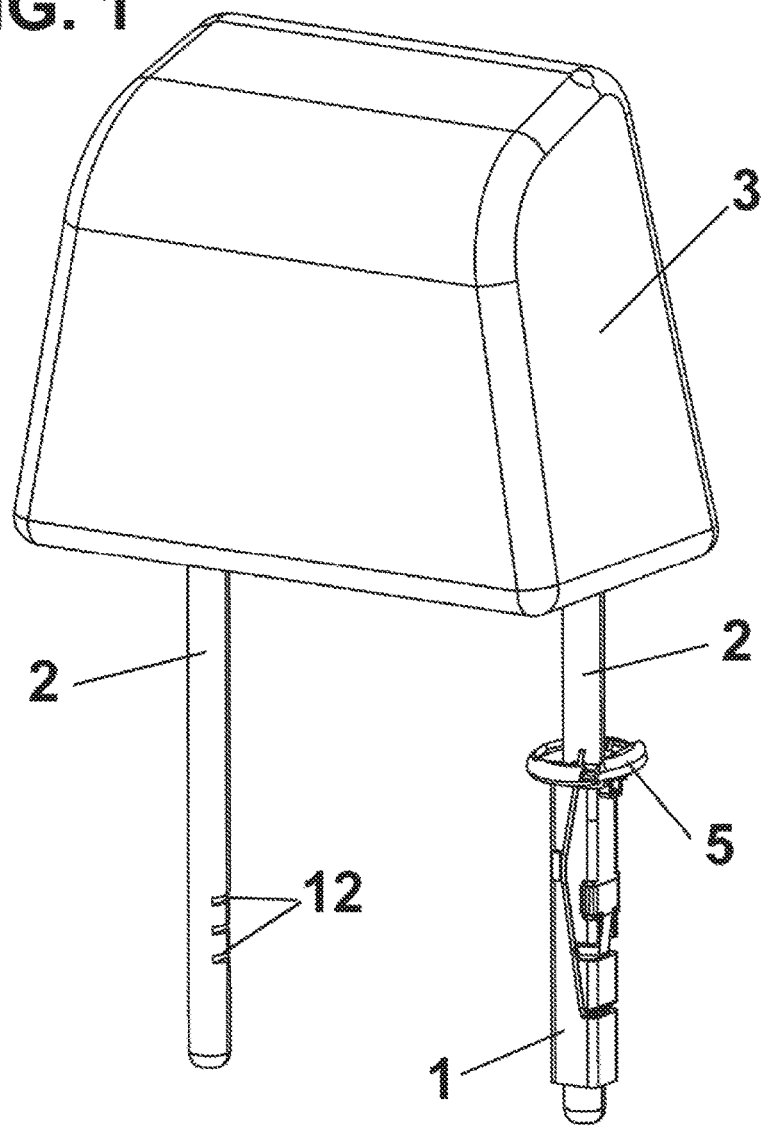

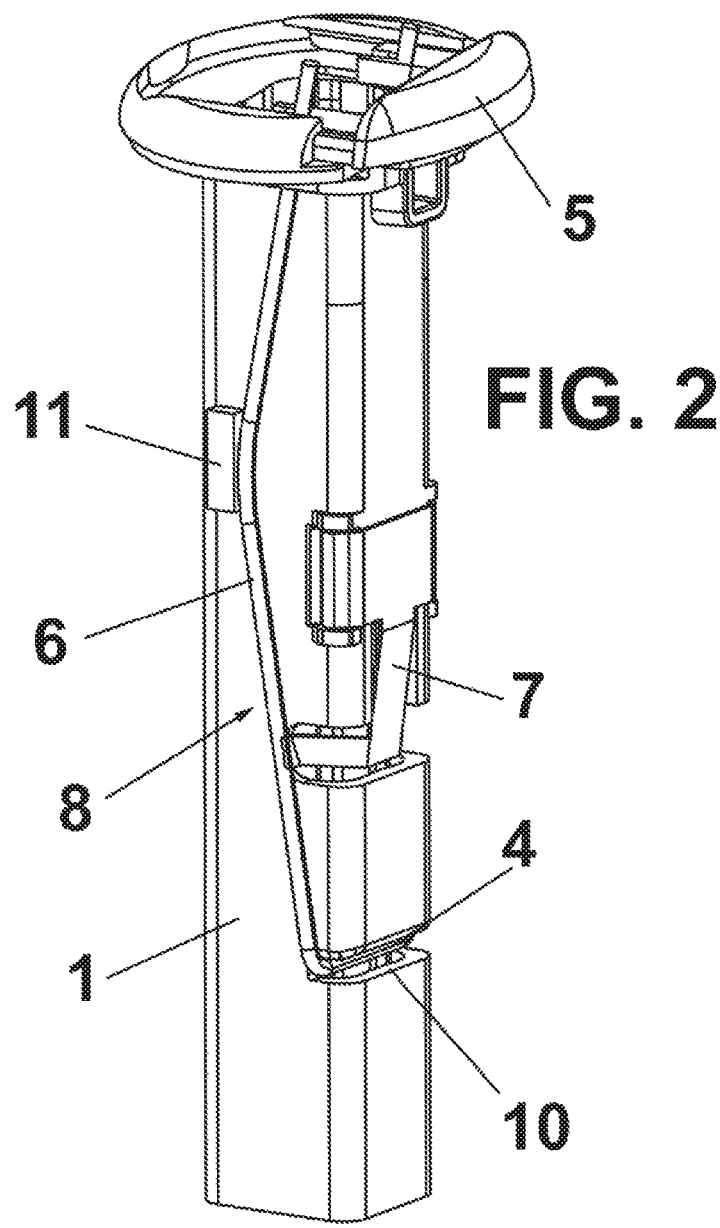

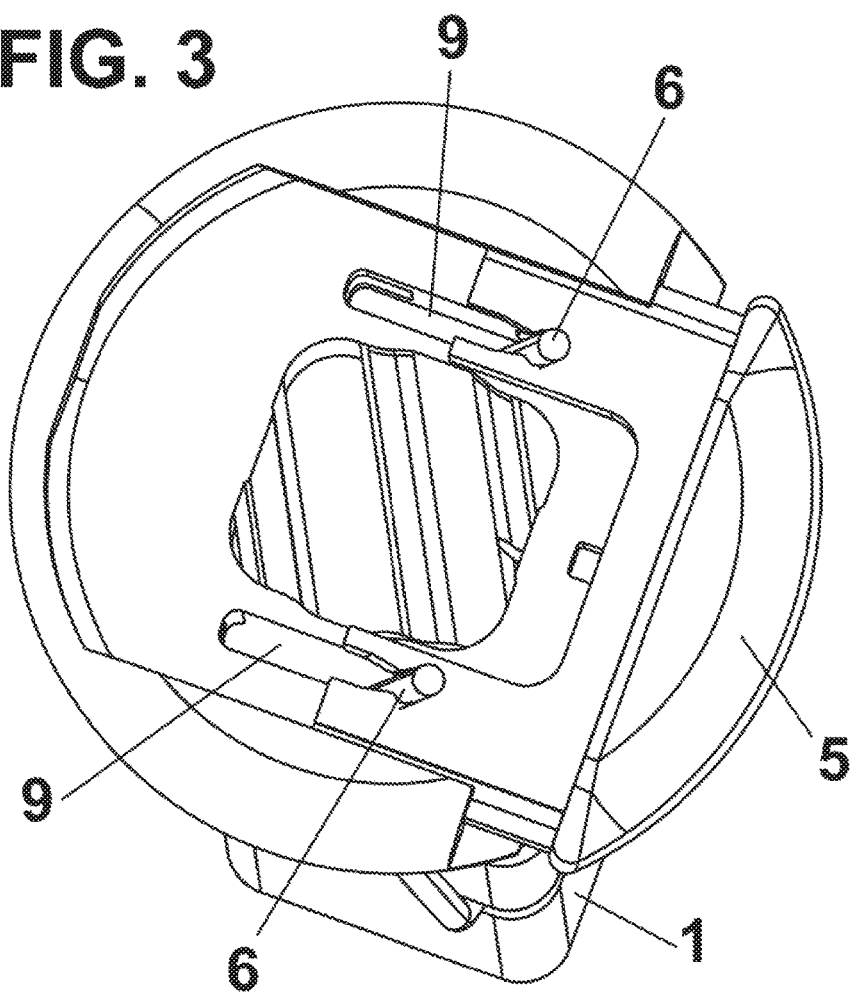

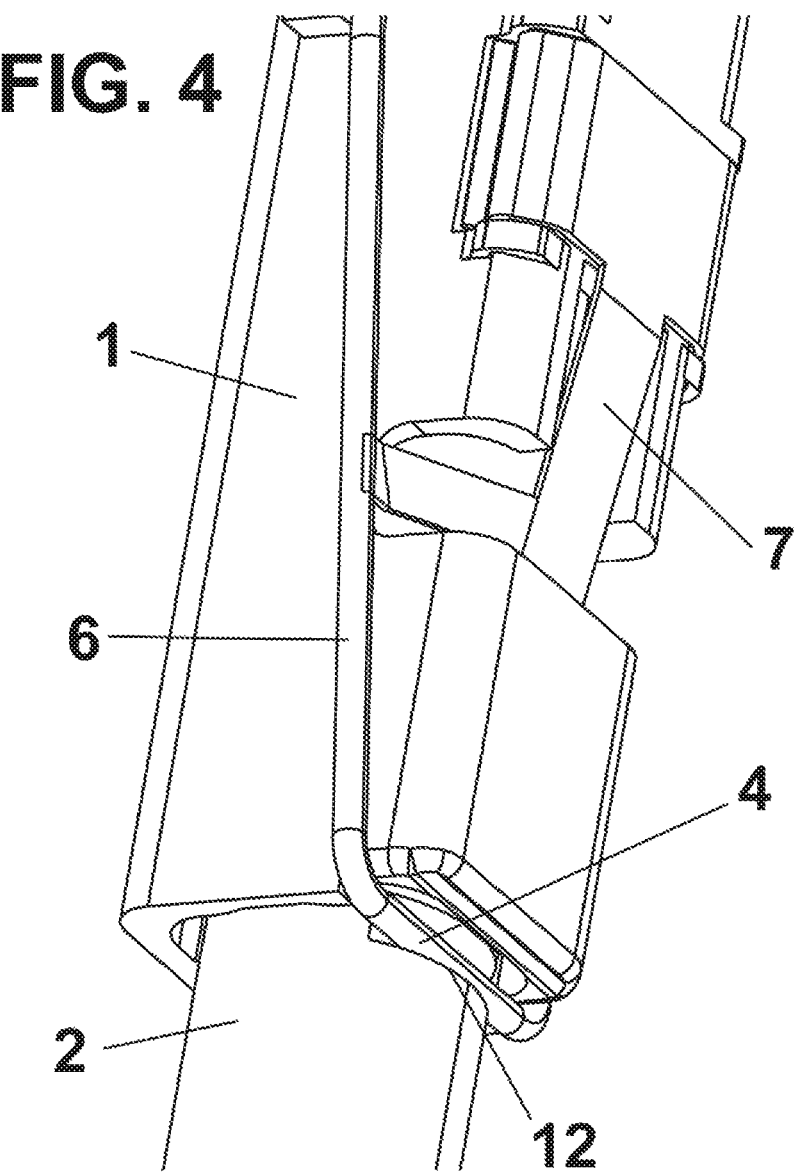

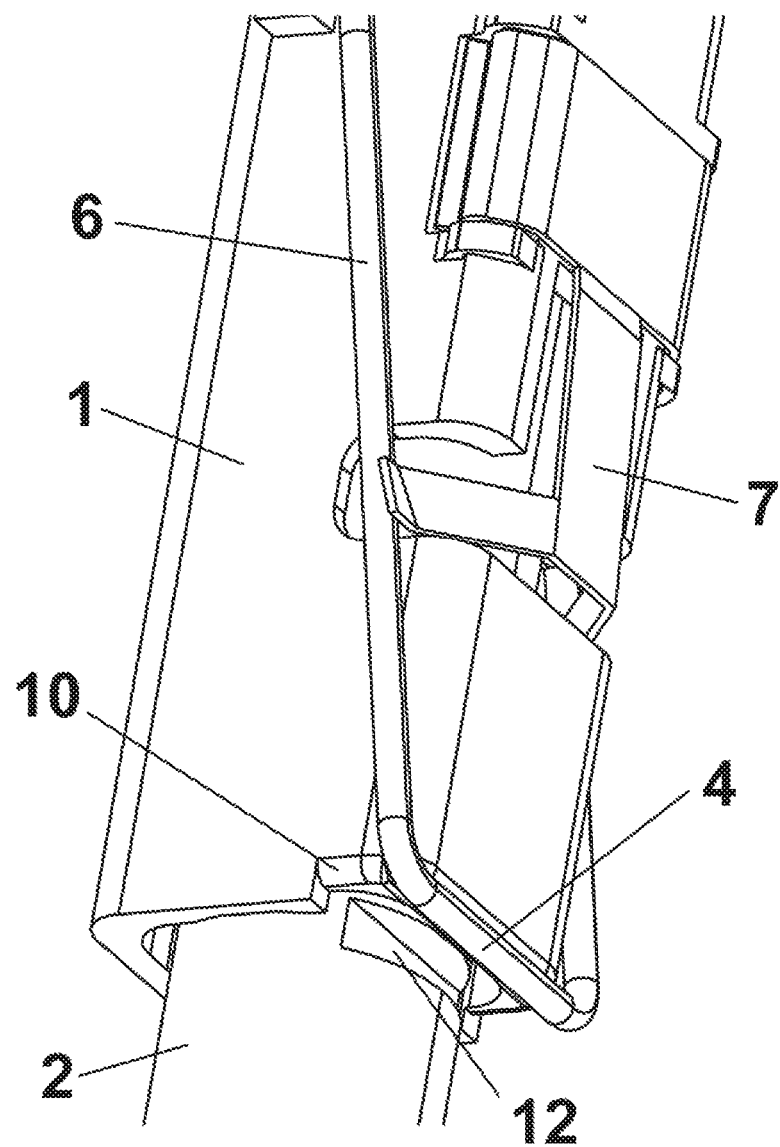

RETAINING DEVICE FOR VEHICLE HEADRESTS

RELATED APPLICATIONS

The present application is a National Phase of International Application Number PCT/US2014/073002, filed Dec. 31, 2014, and claims priority to Spanish Application Number P 201430063, filed Jan. 23, 2014.

The present invention relates to a retaining device for vehicle headrests, in particular for automobile headrests, which can be released in order to adjust the height of the headrest by means of the actuation of a push button.

BACKGROUND OF THE INVENTION

For safety reasons, vehicle seats include a headrest, which in the event of an accident serves as protection for preventing rearward movement of the head.

In order to be able to fulfill their safety function, it must be possible for headrests to be height-adjustable so that they can be adapted to the height of the seat user, and said adjustment must be simple and secure.

Currently, to allow such adjustment, headrests comprise a pair of fixing rods housed inside the seat back, in particular inside guide elements placed in the seat back.

These guide elements comprise a retaining element that can be moved between a retaining position, in which the retaining element is housed in a notch made in the fixing rod, preventing the movement of the fixing rod with respect to the guide element, to a release position in which the fixing rod can move with respect to the guide element in order to adjust the height of the headrest.

This adjustment is achieved by actuating a push button, which allows said retaining element to be moved from its retaining position to its release position.

In the majority of guides, the retainer is located at the same level as the actuation mechanism outside the seat structure. In other cases, the retainer is located inside the seat structure, such that it is necessary to incorporate, aside from the retaining and actuation elements, a mechanism capable of transmitting movement between the parts, thereby increasing the number of required components, and the costs of assembly and manufacture.

DESCRIPTION OF THE INVENTION

The aforesaid drawbacks can be resolved by the retaining device for vehicle headrests of the invention, which offers other advantages described below.

The retaining device for vehicle headrests according to the present invention comprises:
- a guide element inside which a fixing rod for fixing a headrest can be housed;
- a retaining element movable between a retaining position, in which it prevents the movement of said fixing rod with respect to said guide element, and a release position, in which it allows the movement of said fixing rod with respect to said guide element;
- a push button for moving said retaining element from said retaining position to said release position;
- at least one lever linked with said push button transferring the movement of said push button to the retaining element, which may be located at a different level; and
- an elastic element pushing said lever towards the retaining position of said retaining element, and is characterized in that said retaining element and said lever are made in a single piece.

According to a preferred embodiment, said retaining element and said lever are formed from a rod.

Preferably, said rod is U-shaped, the lower portion of which is the retaining element and its arms are respective levers.

Furthermore, the lever or each lever is preferably formed by two straight sections defining an obtuse angle, and said guide element comprises at least one supporting element for achieving rotation, contacting the sections of the lever or each lever.

According to a preferred embodiment, said push button comprises at least one groove for housing the upper end of the lever.

Advantageously, said guide element comprises a hole in which said retaining element is housed in its retaining position.

The retaining device according to the present invention offers at least the following advantages:
- it provides an economic advantage in terms of the manufacture and assembly thereof, since a smaller number of components is required as the retaining element and the lever or levers are incorporated into a single component;
- it withstands impacts better, since the forces associated with impacts are transferred directly to the seat structure;
- it can be used in all types of vehicle seat;
- there is no appreciable change for users, since the push button is actuated in the same way as currently.

BRIEF DESCRIPTION OF THE DRAWINGS

For the purposes of a better understanding of that which is set forth, drawings are attached, which schematically and solely by way of non-limiting example represent a practical embodiment.

FIG. 1 is a perspective view of the retaining device according to the present invention in the position of use thereof in combination with a vehicle headrest;

FIG. 2 is a perspective view of the retaining device according to the present invention in the retaining position thereof;

FIG. 3 is a top view of the retaining device according to the present invention;

FIG. 4 is a is a perspective view of the detail of the lower portion of the retaining device according to the present invention in the retaining position thereof; and FIG. 5 is a is a perspective view of the detail of the lower portion of the retaining device according to the present invention in the release position thereof.

DESCRIPTION OF A PREFERRED EMBODIMENT

FIG. 1 shows a headrest 3 that comprises a pair of fixing rods 2, one of which is housed inside a retaining device according to the present invention.

As may be seen from this figure, the fixing rods 2 comprise grooves 12 that will be used to fix the height of the headrest 3.

The retaining device according to the present invention comprises a guide element 1 inside which a fixing rod 2 of the headrest 3 is housed and a retaining element 4 movable between a retaining position (represented in FIG. 4), in which the movement of said fixing rod 2 with respect to said guide element 1 is prevented, and a release position (represented in FIG. 5), in which it allows the movement of said fixing rod 2 with respect to said guide element 1.

Furthermore, the retaining device according to the present invention comprises a push button 5 for moving said retaining element 4 from said retaining position to said release position, at least one lever 6—two, in the case of the embodiment represented—linked with said push button 5 transferring the movement of said push button 5 to the retaining element 4; and an elastic element 7 pushing said lever 6 towards the retaining position of said retaining element 4.

In order that it is possible to place the retaining element 4 in the retaining position, the guide element 1 comprises a hole 10, as may be seen from the figures.

According to the present invention, the retaining element 4 and the levers 6 are made in a single piece. According to the preferred embodiment represented, a rod 8 of U-shape defines the retaining element 4 and the levers 6 such that the lower portion of the U is the retaining element 4 and the arms of the U are the levers 6.

Each lever 6 is preferably formed by two sections defining an obtuse angle, as may be seen from the figures, and at least one supporting element 11 for achieving the rotation contacting the sections of the lever or each lever.

The upper portion of said levers 6 is housed in respective grooves 9 provided in the push button 5, as may be seen better from FIG. 3.

The retaining device according to the present invention operates as follows:

The guide elements 1 are placed in the upper portion of the back of a vehicle seat and the fixing rods 2 are housed inside said guide elements 1.

In this position, the retaining element 4 is housed inside one of the grooves 12 of said fixing rod 2, immobilizing the headrest 3.

In order to change the height of said headrest 3 with respect to the upper portion of the seat back, the user has to push the push button 5 horizontally. When the push button 5 is pushed, the upper end of the levers 6, housed in the grooves 9, will be moved as a result, giving rise to the movement of said retaining element 4 from its retaining position to its release position.

This movement is achieved by virtue of the rotation of the rod 8 (formed by the levers 6 and the retaining element 4) with respect to the point of rotation of the supporting element 11.

In this position, the retaining element 4 is outside said notch 12 and will allow the movement of the fixing rod 2 with respect to said guide element 1.

When the headrest 3 has been placed in the required position, the push button simply has to be released and, owing to the action of the elastic element 7 on the rod 8, the retaining element 4 will return to its retaining position.

Despite the fact that reference has been made to a specific embodiment of the invention, it is obvious for a person skilled in the art that the retaining device described can undergo numerous changes and modifications and that all the details mentioned may be replaced by other, technically equivalent, details without departing from the scope of protection defined by the attached claims.

The invention claimed is:
1. Retaining device for vehicle headrests, comprising:
a guide element configured to house inside the guide element, a fixing rod for fixing a headrest;
a retaining element movable between a retaining position, in which the retaining element prevents movement of said fixing rod with respect to said guide element, and a release position, in which the retaining element allows movement of said fixing rod with respect to said guide element;
a push button for moving said retaining element from said retaining position to said release position;
at least one lever linked with said push button transferring movement of said push button to the retaining element; and
an elastic element pushing said lever towards the retaining position of said retaining element,
wherein said retaining element and said lever are made in a single piece.
2. Retaining device for vehicle headrests according to claim 1, wherein said retaining element and said lever are formed from a rod.
3. Retaining device for vehicle headrests according to claim 2, wherein said rod is U-shaped, the lower portion of which is the retaining element and arms of the retaining element are respective levers.
4. Retaining device for vehicle headrests according to claim 1, wherein at least one of the at least one levers the is formed by two straight sections defining an obtuse angle.
5. Retaining device for vehicle headrests according to claim 4, wherein said guide element comprises at least one supporting element contacting the sections of at least one of the at least one levers.
6. Retaining device for vehicle headrests according to claim 1, wherein said push button comprises at least one groove for housing the upper end of the lever.
7. Retaining device for vehicle headrests according to claim 1, wherein said guide element comprises a hole in which said retaining element is housed in the retaining element's retaining position.

* * * * *